United States Patent Office 3,506,435
Patented Apr. 14, 1970

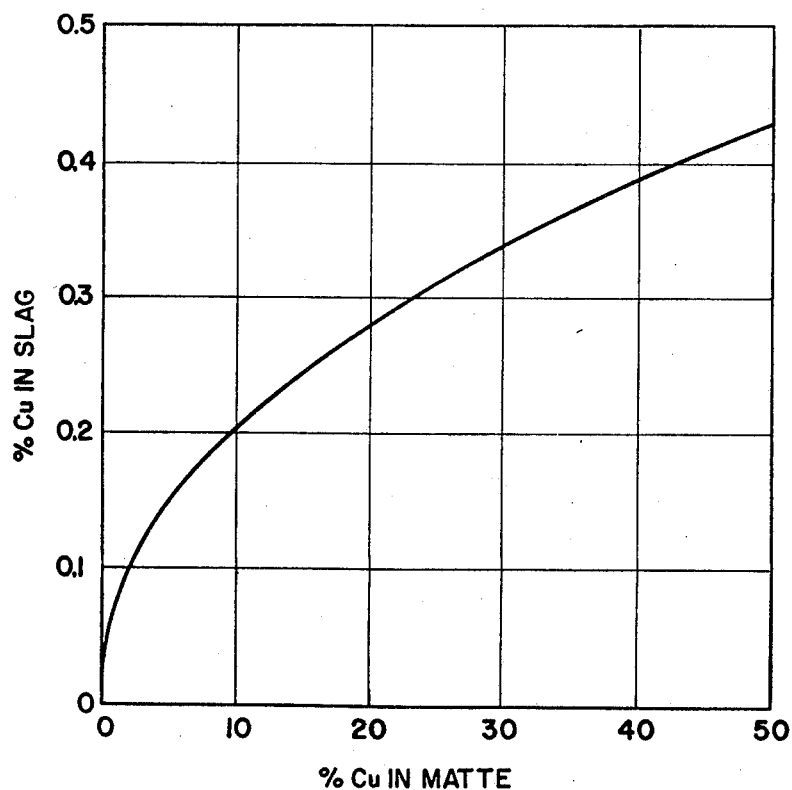

3,506,435
**LIQUID-LIQUID EXTRACTION OF REVERBERA-
TORY AND CONVERTER SLAGS BY IRON SUL-
PHIDE SOLUTIONS**
Nickolas J. Themelis, Beaconsfield, Quebec, Paul Spira,
Montreal, Quebec, and Frank Ajersch, Ville d'Anjou,
Quebec, Canada, assignors to Noranda Mines Limited,
Toronto, Ontario, Canada
Filed Apr. 3, 1967, Ser. No. 627,778
Claims priority, application Great Britain, Apr. 15, 1966,
16,590/66
Int. Cl. C21b *3/04;* C22b *15/00, 23/00*
U.S. Cl. 75—24                                   15 Claims

ABSTRACT OF THE DISCLOSURE

A process for recovering copper from copper containing iron silicate slags which involves introducing into the slag molten material which has a metal content lower than an equilibrium value between the metal content of the slag and the molten material, agitating the molten material and the slag and allowing them to settle into separate layers and then reducing the metal content in the slag to the equilibrium value and discharging the depleted slag and recovering the non-ferrous metal from said material.

---

This invention relates to a process for the recovery of non-ferrous metals from metallurgical slags.

More particularly the invention relates to the recovery of copper from copper containing iron silicate slags, such as blast furnace slags, converter slags, and reverberatory slags.

Matte smelting commonly used for extracting metals from sulphide ores is designed to gather the metal values to be extracted into a sulphide phase, known as the matte, which is produced simultaneously with an oxide slag rich in iron and silica. There are, however, many reasons which prevent all of the values from collecting in the sulphide phase. For example, it is known that an equilibrium is set up between the respective concentrations of metal in the sulphide matte and the siliceous slag so that it is impossible for all of the metal to enter the matte. Oxides, silicates or sulphides of the non-ferrous metals become dissolved in the slag and small particles of sulphides become dispersed in the slag, resulting in appreciable losses of values in the slag. The particles entrained in the slag are too small to settle out of the slag in a reasonable time. Studies have also shown that a substantial fraction of the copper content in the slags produced during the smelting and converting of copper ores and concentrates is present as dissolved copper sulphide, the remainder being present as globules of matte. For example, a reverberatory slag with 0.40% copper may contain 0.20% copper as dissolved sulphide, while converter slag generally holds about 0.5% copper in solution.

The retention of such appreciable quantities of metal in the slag, presents serious economic disadvantages to the smelting process and many efforts have been made to extract residual copper from the various metallurgical slags.

For example, Simcox et al. in United States Patent 2,035,016, subject slag and matte to agitation in a suitable container, thereby causing the dissolved and suspended copper to enter the matte. The agitation is achieved with an inert gas or steam. Fowler et al. in United States Patent 1,822,588, suggest a similar process of agitating slag and matte together in order to transfer valuable metal from the slag into the matte. In this case, the agitation is achieved by injecting a reducing agent. The principle of the process is basically one of reduction of oxidized metals in the slag, although the teachings indicate that the mere fact of agitating the bath will cause agglomeration of small suspended matte globules originally present in the slag. Dissolved and suspended copper is thereby transferred into the matte. Kalling in United States Patent 2,295,219, describes a somewhat similar process to that of Fowler and Simcox, namely the agitation of slag and matte to achieve intimate contact and transfer of metal from slag to matte. Kalling recognizes a principle of slag matte equilibrium in contacting the slag with the matte having a lower valuable metal content than the matte originally present during slag formation and in contrast to Fowler and Simcox, he is aware that only certain kinds of matte will result in cleaning slag to very low levels. In Kalling the sulphide compound should preferably be substantially free from those metals which are to be extracted from the slag. Any matte can remove suspended matte in slag by washing and collection, but the dissolved fraction of metal losses can only be extracted by consideration of the solubility equilibrium between the slag and matte. Kalling includes as an essential requirement of his matte a certain amount of metallic iron. In common with Fowler and Simcox, Kalling proposes that each batch of slag shall be treated with at least one fresh charge of ferrous sulphide, a very complicated and time-consuming operation which could not possibly be carried out on a large scale.

In contrast to all of the known prior art, we have now found that it is possible to achieve a liquid-liquid extraction process for recovering non-ferrous metals from slag wherein the slag is treated batchwise or continuously by contacting the bulk of slag with molten ferrous sulphide or with a molten matte having a metal content lower than the equilibrium value corresponding to the metal content of the slag to be cleaned. The contact between the slag and matte is enhanced by agitation and any known means of agitation can be employed, including the use of oxidizing reducing or neutral gas injection. In contrast to Kalling, we do not find it necessary to include metallic iron in the matte provided that the special relationship between the molten ferrous sulphide or molten matte with respect to the metal content of the slag is observed. We have also found that when the extraction is carried out batchwise, a single charge of matte or ferrous sulphide may be used to treat several charges of fresh slag consecutively, the grade of the matte gradually increasing to a maximum value determined by the equilibrium relationship discussed hereinbelow. When the maximum value has been reached, the matte is discharged from the extraction vessel and the extracted metal can be recovered from the matte by conventional techniques. It will be seen, therefore, that the prior art recognized generally that metal values can be removed from a metallurgical slag by creating turburlence in the molten matte and slag, but failed to recognize that only certain kinds of matte will result in cleaning slag to very low levels (Fowler and Simcox) and although Kalling recognized the principle of slag matte equilibrium, it was not appreciated that metallic iron in the matte was unnecessary. Further, none of the prior art methods could be used on a continuous basis and it was not possible to treat a number of batches of slag with a single batch of matte. The Kalling process could not possibly be used on a large scale, for example 3,000 tons per day of slag as contemplated in the present invention, except with a large number of cleaning vessels, due to the many matte charges to be handled. In the present process a single cleaning vessel can be worked on a very large scale.

It is therefore the object of one aspect of the present invention to provide an improved method for recovering non-ferrous metals from iron silicate slags containing said metals.

In the course of studies and experiments, it has been confirmed that when a molten copper-containing slag is contact with molten pyrites, or with molten copper sulphide or copper matte, there is an interchange of copper between the two liquid layers. For example, in one experiment a crucible was charged with a reverberatory slag (38% $SiO_2$, 0.37% Cu) and the slag melted. Molten ferrous sulphide was introduced into the crucible through a quartz tube to form a layer under the slag, without being allowed to mix with the slag phase. One hour later a slag sample was taken and chemical analysis showed that the copper content of the slag had now decreased to 0.1%.

In a similar experiment, copper sulphide ($Cu_2S$) was introduced under the slag layer instead of FeS. In this case, after one hour the slag contained 0.7% copper.

In a further experiment, a slag of low copper content (0.1% copper) was contacted in the molten state with a layer of molten reverberatory matte (30% Cu), and within an hour the copper content of the slag had increased to 0.3% Cu.

In yet another series of experiments, samples of molten reverberatory slag (0.3% copper) were allowed to stand in contact with various grades of copper matte for up to three hours, and at the end of that time the distribution of copper between the two phases was determined. It was found that where a very low grade copper matte was used, i.e. of the order 1% copper, the copper content of the slag had decreased to 0.05%, while with high grade copper matte, i.e. of the order 60 to 70% copper content had increased to at least 0.5% Cu.

It is clear, therefore, that there exists an equilibrium between the molten copper containing slag and molten matte of every grade from pure FeS to pure $Cu_2S$, the equilibrium being established, for small quantities at least, after a period of the order of 1½ hours.

The same type of equilibrium is known to exist in the case of other metals, such as nickel and cobalt, when slag and matte containing these metals are brought together and allowed to remain in contact for a sufficiently long period of time. Although the actual existence of such an equilibrium has been known the critical quantative equilibrium disclosed herein has not previously been appreciated.

The invention will now be described in more detail with reference to the accompanying drawing which is a graph illustrating the equilibrium distribution of copper between matte and slag.

The figure demonstrates that, in order to decrease the copper content of a slag to a predetermined level, it is necessary to bring this slag into contact with matte of a copper content below a definite upper limit. Diagrams similar to that shown in the figure can be established for other metals present in slag, and in particular, for nickel and cobalt.

In the particular case of converter slag, which may contain over 1% copper, the matte grade may be allowed to rise to as high as, for example, 30% copper before removing the matte from the extraction vessel. It will be seen from the figure that the last charge of slag to be cleaned will have a residual copper content slightly in excess of about 0.3%.

It has also been found that the slag to be treated by the liquid-liquid extraction process should preferably have a very low content of magnetite. The magnetite content of the slag may be reduced in a separate vessel prior to liquid-liquid extraction or in the extraction vessel proper, either before or during the extraction process.

As indicated by the above experiments, the liquid-liquid extraction can be performed simply by allowing the two liquids to stand in contact with each other. As the surface area of contact between the two liquids is quite small in relation to the total volume of material to be treated, the time required to reach equilibrium is considerable. The extraction can be considerably speeded up by promoting liquid-liquid contact, for example by agitation of the molten bath. As indicated hereinbefore, said agitation may be achieved by any known means such as mechanical means, by stirring or by rocking, rotation, etc. of the vessel or furnace in which the extraction is being performed. Even simple pouring of one liquid into the other will promote liquid-liquid contact and so speed up the extraction. In the preferred embodiment of the present invention, the agitation is achieved by injecting into the molten mass through tuyeres or lances air or steam or an inert gas, e.g. nitrogen, or more preferably, a reducing gas. The particular advantage of a reducing gas, such as a steam propane mixture, is that a simultaneous reduction of the magnetite content of the melt is achieved. Pyrites can also be injected with any of the above gases while the agitation is being performed, for the purpose of reducing magnetite. Any solid, liquid or gaseous reducing agent may be injected in a similar manner, for instance, mixtures of air or steam with pulverized coal or with fuel oil. After blowing or mechanical agitation, as the case may be, the melt is allowed to settle before separation of the two layers. With agitation of the melt, the whole extraction, i.e. agitation and settling, can be performed within 20 to 30 minutes. Generally the agitation need only be performed for a few minutes, e.g. two to three minutes. By these processes, copper containing slags can be reduced to less than 0.1% copper in less than thirty minutes.

The temperature of the melt during extraction should be such as will produce a melt having a fluidity that will facilitate the mixing and separation of the two liquid phases. In general it may be stated that a temperature of about 225° F. is satisfactory.

The extraction process can be conducted in any convenient vessel or furnace. Preferably, the extraction is performed in a cylindrical tilting furnace, such as a Peirce-Smith converter. The rotary furnace will be equipped with one or more oil or gas burners which maintain the bath in a molten state and provide a partially reducing or inert atmosphere, to prevent the excess formation of magnetite during the process.

In a preferred method of performing the extraction process of the invention, the furnace is first charged with pyrites which is brought into the molten ferrous sulphide state. A charge of slag, for instance copper containing slag, is added and the total charge heated to about 2250° F. Air or steam or a steam propane mixture or nitrogen is injected through suitably placed tuyeres or lances into the sulphide layer. The blowing is continued for two to three minutes and then the melt is allowed to settle. After settling for 20 to 25 minutes, the slag layer is discharged. A fresh charge of slag is then added and the blowing and settling repeated. The half-hourly cycle can be repeated as many times as desired as the copper content of the ferrous sulphide layer gradually rises. The process can be carried on until the content of the extracted metal, e.g. copper, in the sulphide layer rises to 10% or more, the exact value of the matte grade depending on the required extent of cleaning to be achieved in the slag. It may be necessary to add fresh pyrites to the bath at intervals to replace that converted to iron oxide by oxidation. The addition of pyrites may be done, for example, during the mixing period by injection through the lances or tuyeres with any of the gases that are used for agitating the bath. Eventually the sulphide layer can be discharged from the extraction vessel and processed to recover the copper in the conventional process which produced the slag.

By an alternative embodiment, the pyrites may be smelted in a separate furnace to yield molten ferrous sulphide, said ferrous sulphide being subsequently transferred to the extraction vessel prior to adding any slag.

The extremely rapid rate of copper extraction provided by the process of the present invention permits the processing of large volumes of slag in relatively small furnaces, and this, coupled with an extremely high recovery of copper from the slag, renders the process of the invention extremely attractive from an economic point of view. As an illustration of the results to be expected from a commercial operation of the process according to the invention, the following example is given.

EXAMPLE I

Extraction furnace—13 ft. x 30 ft. converter equipped with oil burner and tuyeres.
Burner fuel oil rate—100 I.G./hr.
FeS charged to furnace—75 tons/day.
Volume of FeS layer—560 cu. ft.
Depth of FeS layer—2.5 ft.
Slag charged to furnace—60 tons per batch.
Volume of slag layer—520 cu. ft.
Depth of slag layer—1.6 ft.
No. of batches of slag—50 per day.
Average time per batch—30 min.
Total slag treated—3000 tons/day.
Average initial Cu content of slag—0.37%.
Average final Cu content of slag—0.12%.
Initial Cu content of FeS—nil.
Final Cu content of FeS—10%.
Copper recovery—7.5 tons/day.
Weight of slag/weight of matte—40:1.

The invention will be further illustrated by the following examples:

EXAMPLE II

Thirty-five tons of pyrites were smelted in an oil-fired Peirce-Smith converter to yield about 20 tons of molten matte containing 4.5% Cu and 63.1% Fe at a temperature in the range 2000–2250° F. One ladle (13 tons) of converter slag (Cu 1.6%, $SiO_2$ 30.0%) was added and after 17 minutes of settling, the bath was sampled and analyzed at 0.31% Cu, showing that pouring alone caused enough mixing to clean the slag to a very low copper content. Air was then blown through the bath for five minutes at 7000 cu. ft. per min. and a sample of the bath showed 0.24% Cu. After a further 15 minutes settling period a sample of the slag analyzed at 0.18% Cu. A sample of the slag being skimmed showed 0.21% Cu. The matte remaining in the converter analyzed at 5.6% Cu. Following skimming of the slag, a further two ladles (26 tons) of converter slag (Cu 1.0%, $SiO_2$ 29.5%) were added to the bath of matte. After 15 minutes of settling the bath showed 0.43% Cu, again illustrating the favourable effect of pouring the slag into the matte. The bath was then blown with air for five minutes at 9000 cu. ft. per min. and 16 minutes after blowing a sample of the bath analyzed at 0.35% Cu.

In another test, one ladle (13 tons) of converter slag (Cu 0.93%, $SiO_2$ 33.2%) was poured into a bath of matte in an oil-fired Peirce-Smith converter. Air was blown into the bath for five minutes at 6000 cu. ft. per min. Twenty minutes after blowing a sample of the bath showed 0.42% Cu. The matte analyzed at 26.1% Cu and 45.1% Fe.

This example clearly shows the substantial reduction of the copper content of the slag which is achieved rapidly and on a large volume of slag using the liquid-liquid extraction process of the invention.

EXAMPLE III

In a series of tests in a pot furnace various charges of slag containing 0.35% Cu (25 lb.) and low-grade matte (15 lb.) were agitated by lancing the bath with nitrogen for 15 minutes and allowed to settle. With a matte grade of less than 1%, the copper content of the slag was reduced to less than 0.10%. With a matte grade of 8% the copper fell from 0.45% before blowing to 0.23% 15 minutes after blowing and to a final value of 0.15% after ½ hour.

In another test blowing was done for five minutes with two lances into the matte layer, the bulk of which was formed from 750 lbs. pyrites. The matte thickness was about 4½ inches and the slag thickness also about 4½ inches (1000 lb.). The matte grade was 5% and the slag copper content 0.26%. The gas used for blowing was a steam-propane mixture. Nineteen minutes after the end of blowing the copper content of the slag was reduced to 0.16%, while after 36 minutes the copper had fallen to 0.09%. Two additional blows of five minutes each did not change substantially this final value of the copper content of the slag, indicating that a blowing period of less than five minutes would have been adequate to effect intimate contact between slag and matte.

This example further illustrates the rapid reduction of the copper content of reverberatory slag by liquid-liquid contact of the slag with low-grade copper matte.

EXAMPLE IV

In yet another series of experiments, about ¾ lb. of slag (2.2% Cu) and about ¾ lb. of matte (5% Cu) were melted separately in a gas-fired furnace and the slag was then poured into the matte. The charge was blown with nitrogen for ½ minute and 30 minutes later a sample of the slag assayed at 0.16% Cu. The slag was then separated from the matte. A further ¾ lb. of slag was poured into the matte, the charge was blown as previously with nitrogen for ½ minute and after 30 minutes a sample of slag showed 0.19% Cu. Again, the slag was separated from the matte and the matte was reused for treating a third charge of slag, which was cleaned to 0.23% Cu, at which point the matte grade was 12.9% Cu. Six charges of slag were treated consecutively with the same matte in the manner described. At the end of the sixth cleaning cycle the matte grade was 22.5% and the slag was cleaned to 0.29% Cu.

In a further set of experiments, one batch of matte was contacted successively, in the approximate ratio of 1 to 1 by weight, with ten batches of slag, each containing 1.4% Cu. The matte initially contained 5% Cu and after the tenth cleaning cycle its copper content had increased to 28.9% while the slag was cleaned to 0.28% Cu. In the same manner as above, four charges of reverberatory slag were cleaned from 0.31% to 0.12% Cu or less with one charge of very low-grade matte.

This example illustrates the distinguishing feature of the process of the invention, which consists in using one single charge of matte to clean successively many charges of slag.

We claim:
1. A process for recovering a non-ferrous metal from molten iron silicate slag which comprises contacting successive slag charges with a single charge of a molten sulphide material selected from the group consisting of molten ferrous sulphide and a molten sulphide matte of the non-ferrous metal, each slag charge initially having a higher non-ferrous metal content than the non-ferrous metal content of the slag charge when in equilibrium with the charge of molten sulphide material, while maintaining the temperature of the molten sulphide material and the slag sufficiently high to produce a fluid melt which facilitates the mixing and subsequent separation of the slag and the molten sulphide material, thereby to reduce the non-ferrous metal content of the slag charge while increasing the non-ferrous metal content of the charge of molten sulphide material, separating each depleted slag charge from the charge of enriched molten sulphide material and subsequently recovering non-ferrous metal from said enriched molten sulphide material when the non-ferrous metal content thereof has reached a desired level.

2. A process as claimed in claim 1, wherein the non-ferrous metal is selected from the group consisting of copper, nickel and cobalt.

3. A process as claimed in claim 1 wherein the mixture of molten sulphide material and each slag charge is agitated and subsequently allowed to settle into separate layers.

4. A process as claimed in claim 1 in which a single charge of molten sulphide material is contacted with a series of slag charges until said molten sulphide material has a non-ferrous metal content at which it is substantially in equilibrium with a slag charge.

5. A process as claimed in claim 3 in which the slag is a molten silicate slag containing copper.

6. A process as claimed in claim 1 wherein the temperature of said molten sulphide material is approximately 2250° F.

7. A process as claimed in claim 3 in which said agitation is accomplished by the introduction of a reducing gas into the molten matreial or slag.

8. A process as claimed in claim 1 wherein the molten sulphide material is charged with pyrites at selected intervals.

9. A process as claimed in claim 8 wherein said pyrites are smelted in a separate furnace to yield molten ferrous sulphide and including the step of subsequently transferring said ferrous sulphide to said molten sulphide material prior to the addition of slag thereto.

10. A process as claimed in claim 3 in which the agitating step is continued for about three minutes.

11. A process as claimed in claim 3 in which the melt is allowed to settle for at least about 20 minutes.

12. A process as claimed in claim 3 in which the agitating medium is selected from the class consisting of air, steam, a steam-propane mixture or nitrogen.

13. A process as claimed in claim 5 in which the molten silicate slag is contacted with liquid copper matte which contains less than an equilibrium value of copper as between the copper content of the slag and the copper matte.

14. A process as claimed in claim 1 in which a series of slag charges is successively contacted with a single ferrous sulphide charge until said ferrous sulphide contains sufficient copper to reach a predetermined equilibrium value as between the copper content of said ferrous sulphide and said slag.

15. A process as claimed in claim 1 wherein said slag is agitated to facilitate contact between the liquid phases of said molten material and said slag with a reducing gas in sufficient quantity to reduce magnetite present in said molten material.

References Cited

UNITED STATES PATENTS

| | | | |
|---|---|---|---|
| 1,231,349 | 6/1917 | Herreshoff | 75—72 |
| 1,544,048 | 6/1925 | Stout | 75—72 |
| 2,035,016 | 3/1936 | Simcox et al. | 75—24 X |
| 2,295,219 | 9/1942 | Kalling et al. | 75—24 |
| 2,857,263 | 10/1958 | Anderson | 75—24 |

L. DEWAYNE RUTLEDGE, Primary Examiner

G. K. WHITE, Assistant Examiner

U.S. Cl. X.R.

75—72, 82